Patented May 31, 1938

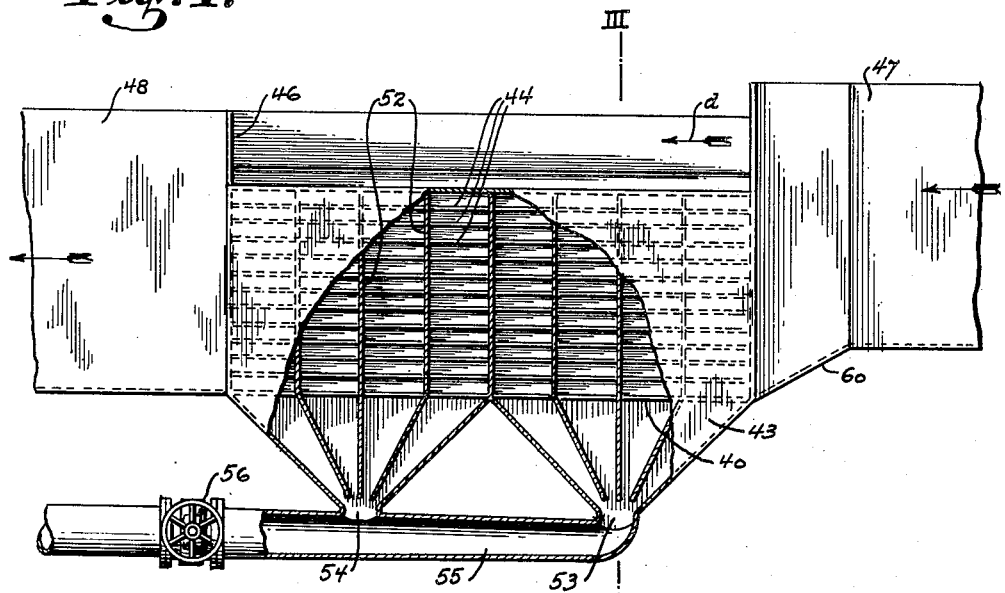
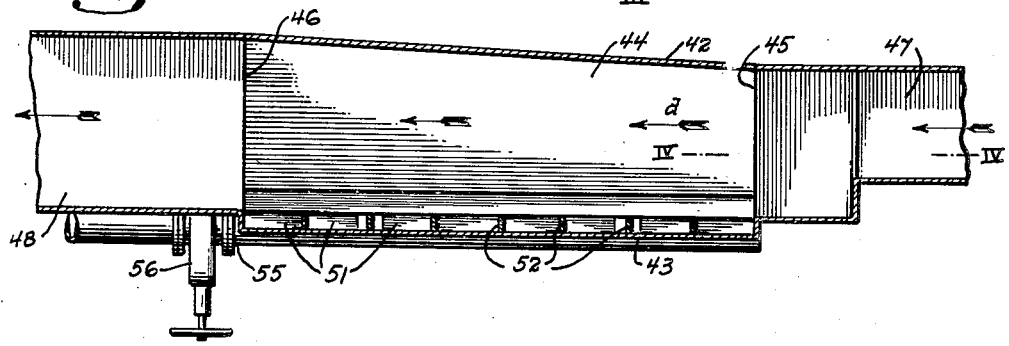
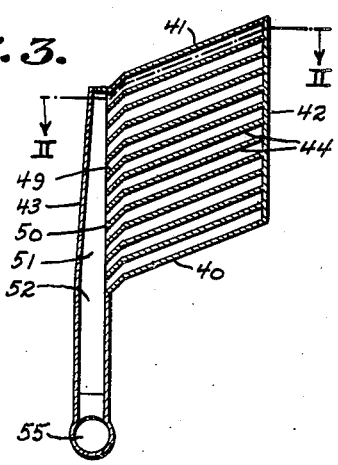
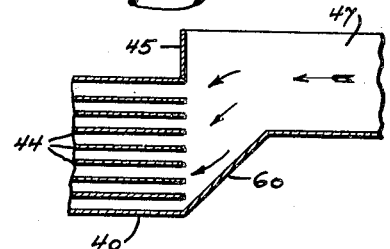

2,119,013

UNITED STATES PATENT OFFICE 2,119,013

APPARATUS FOR REMOVING SOLIDS FROM FLUIDS

Frank W. Kerns, Berkeley, and Warren Egbert, Knights Landing, Calif.

Original application November 14, 1932, Serial No. 642,574, now Patent No. 2,012,567, August 27, 1935. Divided and this application August 24, 1935, Serial No. 37,696

2 Claims. (Cl. 210—57)

This invention relates to an apparatus for removing solids from fluids; the present application being a division of our co-pending application entitled "Apparatus for removing solids from fluids", filed November 14, 1932, Serial Number 642,574, which has matured into a Patent Number 2,012,567, issued Aug. 27, 1935.

The co-pending application referred to relates to an apparatus whereby solids are removed from fluids by centripetal action, friction and gravity and is particularly intended for removing the finer or lighter materials, such as silt, etc.

Certain fluids, such as water, will often carry both fine and coarse or heavy materials, or heavy materials only which may be removed by gravity action. The apparatus disclosed in the present application is intended for removing the heavier materials only and may be placed ahead of the apparatus shown in the co-pending application to remove the heavier materials and thereby prevent overloading of the apparatus in which centripetal action, etc., is depended upon. Also, the present apparatus may be used alone where heavier materials only are encountered.

The object of the present application is generally to simplify the construction and operation of apparatus of the character described and, particularly, to provide an apparatus whereby solids may be removed from fluids by gravity action and friction.

The apparatus is shown by way of illustration in the accompanying drawing, in which—

Fig. 1 is a side elevation of the apparatus, said view being partially broken away;

Fig. 2 is a plan view in section taken on line II—II of Fig. 3;

Fig. 3 is a cross section taken on line III—III of Fig. 1; and

Fig. 4 is a vertical, longitudinal section taken on line IV—IV of Fig. 2.

Referring to the drawing in detail, and particularly Figs. 1 and 2, 40 indicates the bottom of a conduit, 41 the top, 42 the outer wall of the conduit, and 43 the inner wall of the conduit. Plates 44 are introduced between the top and bottom plates 40 and 41 of the conduit and they are closely spaced so as to divide the stream running through into a number of shallow streams. The plates are laterally inclined throughout their length and they extend from the point indicated at 45, which is the inlet end, to the point 46, which is the outlet end, see Fig. 1. The inlet is supplied with water, or other fluid medium, to be treated by means of a flume or a similar conduit 47. The discharge end is also connected with a pipe or conduit, such as shown at 48, and the passage formed between the flumes 47 and 48 is clearly shown in Fig. 2. The plates are laterally inclined, as shown in Fig. 3, and their inner edges are flanged, as shown at 49, to form inclined edges having a greater angle than the laterally disposed plates. The flanges 49 terminate at the point 50 and a settling chamber 51 is thus formed between the inner edges of the plates and the inner wall 43 of the conduit. Vertically disposed baffle plates 52 are also employed and they serve two functions, to-wit, that of preventing flow and swirling motion of the water in the settling chamber, and they prevent by-passing. The lower portion of the settling chamber is connected at one or more points, such as shown at 53 and 54, with a discharge conduit 55 and the flow through said conduit may be regulated by valve 56 or any other suitable means.

The apparatus shown in the present application does not utilize centripetal action in the separation of the solids from the water, the separation being secured in the present instance by settling of the solid matter on the upper surfaces of the plates 44 and as the plates are laterally inclined and the water or other fluid medium travels in the direction of arrow $d$ the solid particles will roll down the inclined surfaces and finally over the abrupt flanges 49. The solids will thus enter the settling chamber and settle therein, being finally delivered into the conduit 55 and discharged therefrom. The apparatus accordingly functions as a gravity separator and may be used in conjunction with the apparatus shown in our co-pending application; that is, where water carrying a considerable proportion of heavy sand and silt is being treated it may be advisable to get rid of most of the heavy sand before the water enters the apparatus. Hence, by placing the apparatus shown in Figs. 1 and 2 in front of the inlet of the apparatus of the co-pending application, the major portion of the heavy sand may be removed thus leaving the silt and remaining matter to be removed by the apparatus wherein centripetal action functions. If heavier sand and like material are the only material encountered, the entire separating action may be conducted in the apparatus here shown. In this apparatus it is advisable to construct the inlet in the manner shown in Fig. 4, that is, the bottom of the flume or conduit 47 is maintained at an elevation with relation to the bottom plate 40 but at a point adjacent the inlet 45. The bottom plate of the flume is placed on a steep angle, as shown at 60, thus permitting any sand which is settled along the bottom of the flume to be uniformly distributed between the plates as the stream enters between the same.

In actual operation the water entering through the flume 47 will immediately be divided into a number of shallow streams by the plates 44. The heavier sands or other solids contained will rapidly settle on the upper surfaces of the plates and as these are inclined laterally, as shown in Fig. 2, the particles will tend to roll downwardly over the plates and as such will discharge into the settling chamber 51 and will finally be discharged through the conduit 55; the discharge through the conduit 55 being preferably continuous by maintaining the valve 56 sufficiently open to continuously discharge and carry off the solid matter delivered to the conduit 55. The plates employed preferably increase in width from end to end, as shown in Fig. 2, being narrowest at the inlet and widest at the outlet. In Fig. 2 the cover plate is shown as removed and the uppermost of the plates 44 is thus shown. This view clearly illustrates the increasing width of the plates. This is important as it reduces the velocity at the discharge end, thus permitting solid matter entering to gradually drop out as the stream is passing between the plates, thus causing a uniform distribution and removal of the solids and positively preventing clogging and overloading of the inlet ends of the plates.

While certain features of the present invention are more or less specifically described, we wish it understood that various changes may be resorted to within the scope of the appended claims. Similarly, that the materials and finish of the several parts employed may be such as the manufacturer may decide, or varying conditions or uses may demand.

Having thus described our invention, what we claim and desire to secure by Letters Patent is:—

1. An apparatus for separating solid matter from a continuously flowing stream of water, comprising an elongated conduit adapted for the continuous gravital flow of water to be treated, said conduit having an inlet and an outlet at opposite ends for the admission and discharge of water, a plurality of superposed plates extending longitudinally of the conduit substantially from the inlet to the outlet, said plates dividing the flowing body of water horizontally into a plurality of shallow bodies and said plates being tilted laterally with relation to their longitudinal axes to form inclined surfaces, a settling chamber formed at one side of the conduit adjacent the lower edges of the plates, said chamber being in communication with the spaces formed between the plates and extending below the lowermost plate, said extended lower portion of the chamber being gradually reduced in area with the smallest area at the lower end, and a plurality of baffle plates in the settling chamber, the lower ends of said baffle plates being inclined toward each other to form passages between their lowermost ends sufficiently constricted to substantially prevent longitudinal flow of water through the settling chamber.

2. An apparatus for separating solid matter from a continuously flowing stream of water, comprising an elongated conduit adapted for the continuous gravital flow of water to be treated, said conduit having an inlet and an outlet at opposite ends for the admission and discharge of water, a plurality of superposed plates extending longitudinally of the conduit substantially from the inlet to the outlet, said plates dividing the flowing body of water horizontally into a plurality of shallow bodies and said plates being tilted laterally with relation to their longitudinal axes to form inclined surfaces, a settling chamber formed at one side of the conduit adjacent the lower edges of the plates, said chamber being in communication with the spaces formed between the plates and extending below the lowermost plate, said extended lower portion of the chamber being gradually reduced in area with the smallest area at the lower end, a plurality of baffle plates in the settling chamber, the lower ends of said baffle plates being inclined toward each other to form passages between their lowermost ends sufficiently constricted to substantially prevent longitudinal flow of water through the settling chamber, and means connected with the lowermost portion of the settling chamber for permitting continuous discharge of matter settling therein.

FRANK W. KERNS.
WARREN EGBERT.